United States Patent
Kamir et al.

(10) Patent No.: US 11,068,590 B2
(45) Date of Patent: Jul. 20, 2021

(54) SYSTEM AND PROCESSES FOR DETECTING MALICIOUS HARDWARE

(71) Applicant: ENIGMATOS LTD., Yavne (IL)

(72) Inventors: Eyal Kamir, Ganei Tikva (IL); Alexander Fok, Rehovot (IL); Yaniv Tuchman, Zichron-Yaakov (IL); Avi Bitton, Yavne (IL); Uriel Friedman, Ale-Zahav (IL); Meni Dali, Petah Tiqva (IL); Yoni Malka, Ale-Zahav (IL)

(73) Assignee: ENIGMATOS LTD., Yavne (IL)

(*) Notice: Subject to any disclaimer, the term of this patent is extended or adjusted under 35 U.S.C. 154(b) by 0 days.

(21) Appl. No.: 16/621,874

(22) PCT Filed: Aug. 1, 2018

(86) PCT No.: PCT/IL2018/050859
§ 371 (c)(1),
(2) Date: Dec. 12, 2019

(87) PCT Pub. No.: WO2019/026078
PCT Pub. Date: Feb. 7, 2019

(65) Prior Publication Data
US 2020/0380131 A1 Dec. 3, 2020

Related U.S. Application Data (60) Provisional application No. 62/540,160, filed on Aug. 2, 2017.

(51) Int. Cl.
*H04L 29/06* (2006.01)
*G06F 21/55* (2013.01)
(Continued)

(52) U.S. Cl.
CPC ........ *G06F 21/554* (2013.01); *B60R 16/0232* (2013.01); *B60R 16/0239* (2013.01);
(Continued)

(58) Field of Classification Search
None
See application file for complete search history.

(56) References Cited

U.S. PATENT DOCUMENTS

| | | | |
|---|---|---|---|
| 6,173,814 | B1 | 1/2001 | Herkel et al. |
| 6,886,116 | B1 | 4/2005 | MacLellan et al. |

(Continued)

FOREIGN PATENT DOCUMENTS

| | | | |
|---|---|---|---|
| CN | 103884980 | A | 6/2014 |
| CN | 104950247 | A | 9/2015 |

(Continued)

OTHER PUBLICATIONS

Yamazoe, Masahiko; Wakai, Kazuaki. An antenna impedance measuring system for the medium-wave with interference signal suppression function. IEEE Transactions on Broadcasting, vol. 51, Issue: 4. https://ieeexplore.ieee.org/stamp/stamp.jsp?tp=&arnumber=1542393 (Year: 2005).*

(Continued)

*Primary Examiner* — Jeremiah L Avery
(74) *Attorney, Agent, or Firm* — Polsinelli PC (57) ABSTRACT

A system for detecting malicious hardware on a data communication network, such as a vehicle CAN bus, is provided. The system includes a teleprocessing device, an AC signal generating device, and an impedance measuring device. In a preliminary step, a set of impedance measurements of N reference AC signals is formed, and a threshold value is set. The signal generating device injects a set of N AC signals into the network bus and the bus impedance for each of the N frequencies is measured, where a set of impedance values of N RT-signals is formed. Then, each of the impedance values of the RT-signals and the impedance values of the respective reference AC signal are statistically compared, to thereby form a set of N comparison-results.

(Continued)

Upon determining that any of the impedance values of the RT-signals is greater than the threshold, an alert is activated.

21 Claims, 9 Drawing Sheets

(51) Int. Cl.
| | | |
|---|---|---|
| *B60R 25/30* | (2013.01) | |
| *H04L 12/40* | (2006.01) | |
| *H04L 29/08* | (2006.01) | |
| *G06N 20/00* | (2019.01) | |
| *B60R 16/023* | (2006.01) | |
| *G06F 17/17* | (2006.01) | |
| *G06F 21/56* | (2013.01) | |
| *G06F 21/71* | (2013.01) | |
| *G06N 5/04* | (2006.01) | |

(52) U.S. Cl.
CPC .............. *B60R 25/30* (2013.01); *G06F 17/17* (2013.01); *G06F 21/566* (2013.01); *G06F 21/71* (2013.01); *G06N 5/04* (2013.01); *G06N 20/00* (2019.01); *H04L 12/40013* (2013.01); *H04L 67/12* (2013.01); *G06F 2221/034* (2013.01); *H04L 2012/40215* (2013.01); *H04L 2012/40273* (2013.01)

(56) References Cited

U.S. PATENT DOCUMENTS

| | | | | |
|---|---|---|---|---|
| 2005/0046584 | A1* | 3/2005 | Breed | B60N 2/0232 340/13.31 |
| 2014/0309789 | A1* | 10/2014 | Ricci | H04W 4/21 700/276 |
| 2014/0309935 | A1* | 10/2014 | Ricci | A61B 7/04 701/540 |
| 2014/0344930 | A1* | 11/2014 | Foley | H04L 63/1475 726/23 |
| 2015/0191135 | A1 | 7/2015 | Ben Noon et al. | |
| 2016/0372923 | A1 | 12/2016 | Behrangrad | |
| 2020/0143049 | A1 | 5/2020 | Kamir et al. | |

FOREIGN PATENT DOCUMENTS

| | | |
|---|---|---|
| CN | 104951698 A | 9/2015 |
| CN | 105046153 A | 11/2015 |
| CN | 105158674 A | 12/2015 |
| WO | 2019026078 A1 | 2/2019 |

OTHER PUBLICATIONS

Martens, Olev et al. Improved impedance analyzer with binary excitation signals. 2015 IEEE 9th International Symposium on Intelligent Signal Processing (WISP) Proceedings, https://ieeexplore.ieee.org/stamp/stamp.jsp?tp=&arnumber=7139156 (Year: 2015).*

Habib, Hamy F. et al. Deployment of electric vehicles in an adaptive protection technique for riding through cyber attack threats in microgrids. 2017 IEEE International Conference on Environment and Electrical Engineering, https://ieeexplore.ieee.org/stamp/stamp.jsp?tp=&arnumber=7977729 (Year: 2017).*

Wang, Xun et al. Search-based physical attacks in sensor networks. Proceedings. 14th International Conference on Computer Communications and Networks, 2005. ICCCN 2005. https://ieeexplore.ieee.org/stamp/stamp.jsp?tp=&arnumber=1523922 (Year: 2005).*

International Search Report; PCT Application No. PCT/IL2018/050859; dated Nov. 15, 2018.

Written Opinion of PCT Application No. PCT/IL2018/050859; dated Nov. 15, 2018.

English Language Abstract of CN103884980; Retreived From www.espacenet.com on Dec. 5, 2019.

English Language Abstract of CN105158674; Retreived From www.espacenet.com on Dec. 5, 2019.

English Language Abstract of CN104950247; Retreived From www.espacenet.com on Dec. 5, 2019.

English Language Abstract of CN10495169; Retreived From www.espacenet.com on Dec. 5, 2019.

English Language Abstract of CN105046153; Retreived From www.espacenet.com on Dec. 5, 2019.

International Preliminary Report on Patentability of PCT Application No. PCT/IL2018/050859; dated Nov. 24, 2019.

* cited by examiner

SYSTEM AND PROCESSES FOR DETECTING MALICIOUS HARDWARE

CROSS-REFERENCE TO RELATED APPLICATIONS

This application is a national stage entry of PCT/IL2018/050859 filed Aug. 1, 2018 which claims convention priority from U.S. patent application 62/540,160 filed on Aug. 2, 2017, the contents each of which are hereby incorporated by reference in their entirety.

FIELD OF INVENTION

The present invention is directed to systems and processes detecting malicious hardware on a data communication network, such as a vehicle CAN bus, and more particularly, to systems and processes for injecting signals of multiple frequencies onto the network bus, measuring the bus impedance, and alerting upon detecting an impedance variation that is greater than a preset threshold.

BACKGROUND AND PRIOR ART

Modern car structure contains communication networks with a plurality of components being typically ECUs. Even simple vehicles have several communication networks responsible for car functions—from braking to flash lights, windshield wipers, etc. Each network contains many ECUs which communicate with each other by implementing protocols such as CAN, Flexray, LIN, Ethernet, etc. The term "CAN" is used herein to represent, with no limitations, all types of vehicle local networks.

Figure 1:
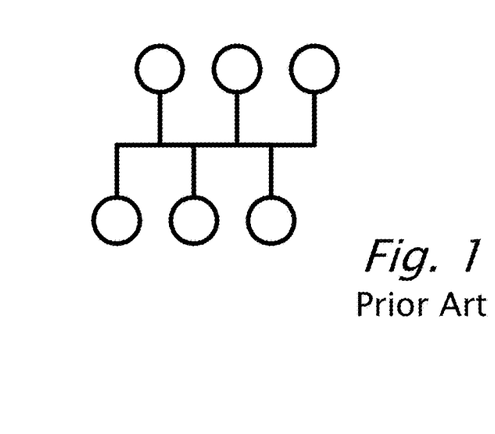
FIG. 1 (prior art) illustrates an example of a network topology.
Figure 2:
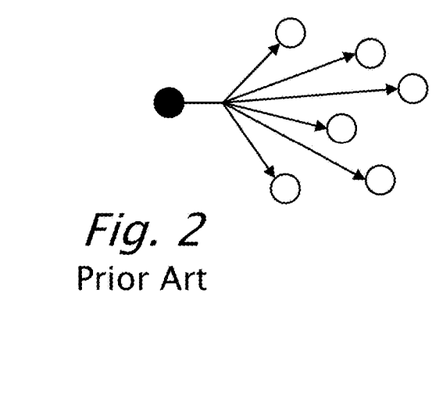
FIG. 2 (prior art) illustrates another example of a network topology.
Figure 3:
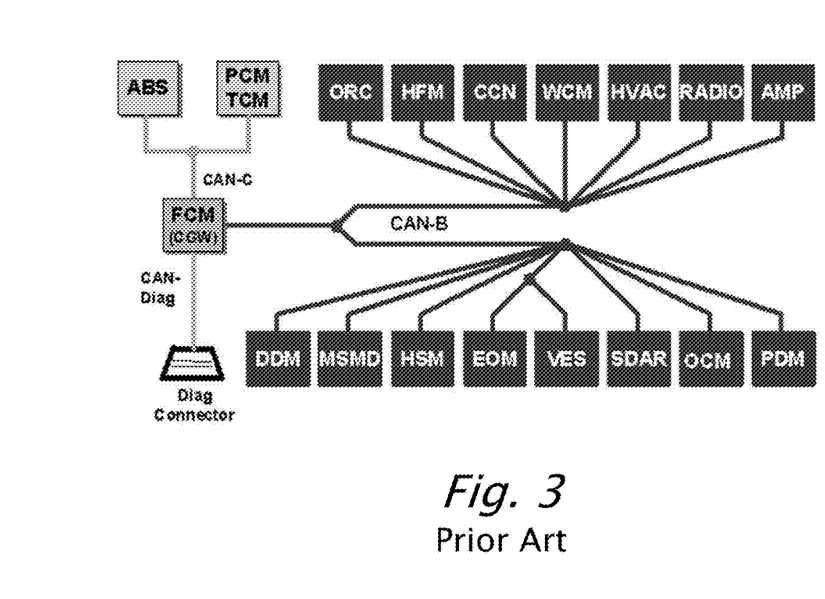
FIG. 3 (prior art) illustrates yet another example of a network topology having various ECUs.
Figure 4:
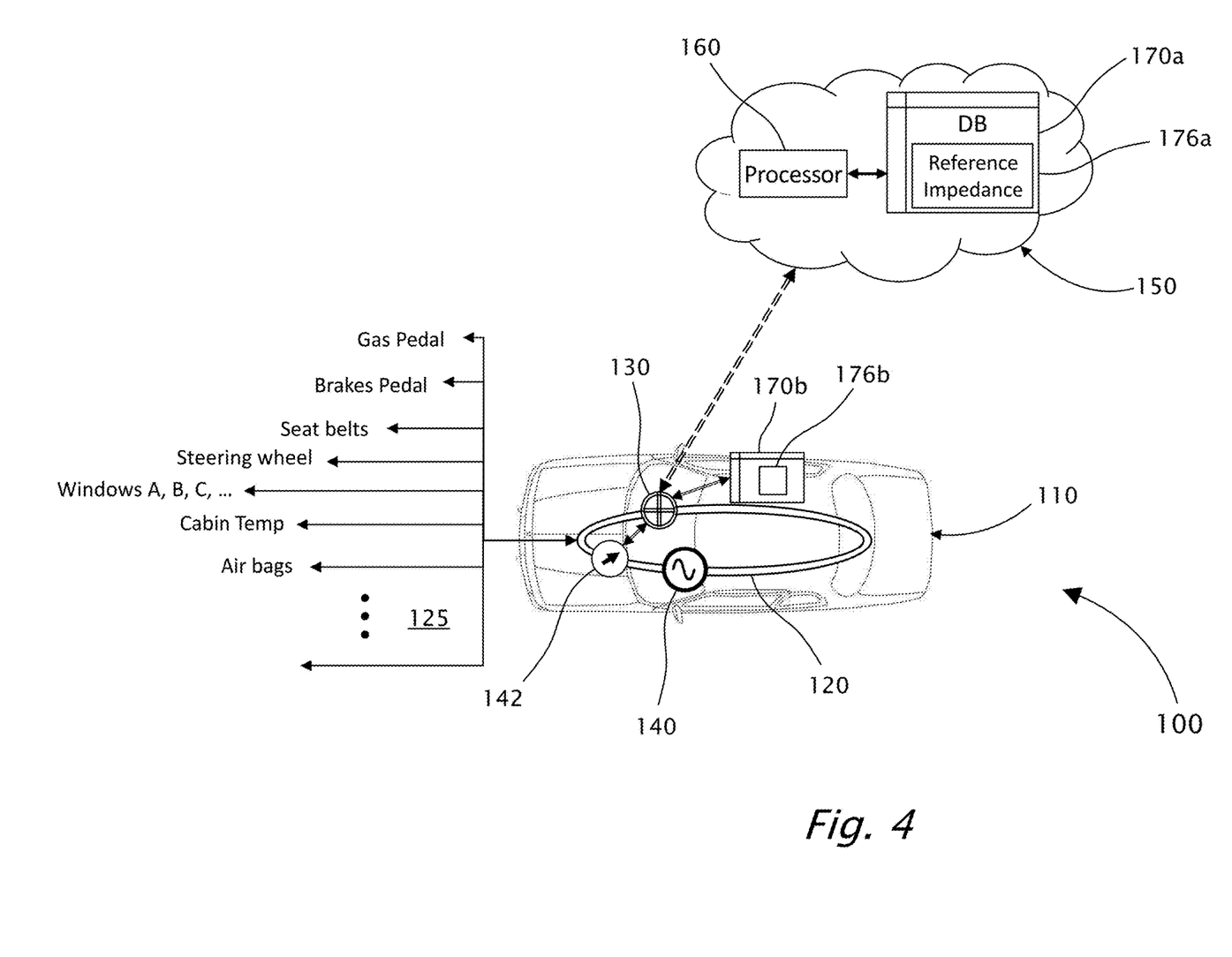
FIG. 4 is a schematic diagram showing an example system for detecting malicious hardware, according to embodiments of the present invention.

There are many communication protocols commonly used in vehicles including CAN bus protocol, FlexRay protocol, MOST bus protocol, LIN and Ethernet protocols and Byteflight databus. These vehicle communication protocols are designed to allow ECUs to communication with each other using a network topology such as described in FIGS. 1 and 2. These protocols are message-based protocols. Each ECU located in the network can send messages to other ECUs on the network as illustrated in FIG. 3. FIG. 4 illustrates, among other things, example components 125 of a vehicle 110 that in normal operation send and/or receive CAN-bus messages over CAN-bus 120, as required.

While prior art embodiments such as U.S. Pat. No. 8,955,130 by Nikolay Kalintsev et al. "Kalintsev" discloses a general solution involving sending signals and measuring outcome for CAN bus protocol or standing wave measuring. The method of the present invention involves impedance measurements that can supply an adequate solution not only for CAN bus lines but a true general solution whether the tested lines are CAN bus, FLexray, Analog lines, etc. Kalintsev did not refer to a problem of the interference of the injected signal with existing equipment sensitivity. Practical experiments showed that injecting a signal to a CAN bus often causes various distortions to ECUs, resulting in a car entering an error state, for example, presenting check engine error.

A hacker, an attacker or a potential attacker can connect his own unit to the network, send malicious messages and commands, impersonate legitimate commands of other ECUs and cause scenarios that can be used for inflicting damages, extortion, endangering human lives and properties.

There is therefore a need for independent methods such as impedance measurement and low current measurement, for detecting such non-authorized connections and track the presence of malicious units.

The terms "car" and "vehicle" are used herein interchangeably.

The term "Deep Sleep Mode" as used herein refers to a state of a vehicle network while the vehicle is shutting down. The shutting down of the vehicle takes some time to perform, wherein during this state, it is expected that a time interval, in which there is no CAN communication for at least a preconfigured time interval (for example, 20 seconds), exists.

The measurement of the impedance of transmission lines is a practical problem in radio technology and other fields. Measurements of impedance may be carried out at one frequency, or the variation of device impedance over a range of frequencies may be of interest. Devices that can carry out such measurements of impedance and the variation of impedance over a range of frequencies are known in the art, for example, AD5933 by Analog Devices: http://www.analog.com/en/products/rf-microwave/direct-digital-synthesis/ad5933.html. Such a device is referred to herein as an "impedance measuring device".

Abbreviations

ABS Advanced Break System
BUS A network topology in which nodes are directly connected to a common linear (or branched) half-duplex link.
CAN Control Area Network
CPD CAN Parasite Detector
CRC Cyclic Redundancy Check
ECU Electronic Control Unit
ERR Error
FlexRay An automotive network communications protocol developed to govern on-board automotive computing. It is designed to be faster and more reliable than CAN and TTP, but it is also more expensive
GPRS General Packet Radio Service
GPS Global Positioning System
HTTP Hyper Text Transfer Protocol
LIN Local Interconnect Network, a serial network protocol used for communication between components in vehicles
MOST bus Media Oriented Systems Transport, a high-speed multimedia network technology optimized by the automotive industry
MSE Mean squared error
OBD On Board Diagnostics
RT Real Time
SWR Standing wave ratio
TTP Time-Triggered Protocol, an open computer network protocol for control systems. It was designed as a time-triggered fieldbus for vehicles and industrial applications
VSWR Voltage standing wave ratio

SUMMARY OF INVENTION

The principal intentions of the present invention include providing independent methods such as impedance measurement and low current measurement, for detecting such non-authorized connections and track the presence of malicious units. The methods based on impedance measurement include generating AC electrical current (I can decide to send and collect related data indicating that a non-authorized connection is present on the network. The methods based on low current injection, either AC or DC current/voltage may be used.

CAN bus protocol allows the CAN physical layer for transmission rates of up to 1 Mbit/s for use within road vehicles. The commonly used CAN bus rates are typically' with no limitations, 125 Kbit/s or 500 Kbit/s or 1 Mbit/s.

In one preferred embodiment, the impedance measurement is performed by a device such as, with no limitations, AD5933 device of Analog Devices. In this measurement frequency rates measurements can usually be in the range of several Khz to several dozen Khz—for example 5 Khz to 30 Khz. However, these measurements can interfere with the proper operation of the vehicle's systems since measurement frequencies are not very different than bit rates commonly used in vehicles systems. In such embodiment, measurements take place in Deep Sleep Mode. Since typically, intruders can place a malicious hardware on a vehicle data communication network when the vehicle 110 is inactive. Hence, making the impedance measurement during Deep Sleep Mode, makes sense.

When the monitoring unit that monitors CAN bus, and when there is no communication on that bus for a specific, preconfigured time duration (for example, with no limitation—there is no CAN communication for at least 20 seconds), the monitoring unit allows for impedance measurement and does not allow on board diagnostics (OBD) requests and communications during that same time. Therefore, during the Deep Sleep Mode, the impedance measurement does not interfere with other communications, and the measurement result is thus reliable.

In another embodiment, the impedance measurements are performed in a different range of frequencies, for example, with no limitations, several hundred Mhz range (for example 300 Mhz or 400 Mhz). This enables much quicker measurements since measurement period is much shorter, without interfering with vehicle systems. Therefore, such embodiments are operable including when vehicle is active.

The present invention further provides statistical measures such as MSE comparing, to thereby improve the successful rates and properly distinguish between malicious units and approved units. In some embodiments, the statistical comparison uses a machine learning technique of data sets comparison, as an alternative to the mentioned MSE averaging. For example, a prediction algorithm such as logistic regression, random forest or other machine learning algorithms that can be leveraged to improve the system performance results.

The system of present invention can be deployed in existing car architectures and does not require significant car architecture modifications.

According to the teachings of the present invention there is provided an example system for detecting malicious hardware on a data communication network, such as a vehicle data communication network, having a network bus, the system including a teleprocessing device coupled with digital memory, an AC signal generating device, and an impedance measuring device.

In a preliminary initialization step, the teleprocessing device forms and stores in the digital memory a set of N reference AC signals injected by the AC signal generating device into the data communication network, wherein each of the AC signals in the set of N reference AC signals has a different frequency, and wherein each of the AC signals in the set of N reference AC signals is the average of $k_1$ impedance measurements of multiple AC signals of the same frequency, wherein $k_1 > 0$.

In a second preliminary initialization step, an initial impedance-related alert-threshold value is set and stored in the digital memory.

The teleprocessing device is configured to activate the AC signal generating device to thereby inject the set of N AC signals into the data communication network.

The teleprocessing device is further configured to activate the impedance measuring device to thereby measure the network bus impedance for each of the N frequencies, forming a set of impedance values of N RT-signals each of a different frequency as in the set of N reference AC signals.

The teleprocessing device is further configured to statistically compare each of the impedance values of the RT-signals with the respective impedance values of the respective reference AC signal, to thereby form a set of N comparison-results, wherein upon determining, by the teleprocessing device, that any of the impedance values of the RT-signals is greater than the alert-threshold value, the teleprocessing device activates an alert.

Optionally, each of the impedance values of the N RT-signals is an average of $k_2$ impedance measurements for each frequency, wherein $k_2 > 1$.

Optionally, the statistically comparing is uses on Mean Square Error (MSE) computation.

Optionally, the statistically comparing is used on a machine learning technique of data sets comparison, the machine learning technique is a prediction algorithm selected from the group including a logistic regression and random forest.

Optionally, the digital memory is part of a remote server.

According to further teachings of the present invention there is provided an example process for detecting malicious hardware on a data communication network having a network bus, the process includes the steps of:
 a. providing an AC signal generating device;
 b. providing an impedance measuring device;
 c. providing digital memory for storing digital data;
 d. in a first preliminary initialization step, forming and storing in the digital memory a set of N reference AC signals injected by the AC signal generating device into the data communication network, wherein each AC signal in the set of N reference AC signals has a different frequency, and wherein each AC signal in the set of N reference AC signals is the average of $k_1$ impedance measurements of multiple AC signals of the same frequency, wherein $k_1 > 0$;
 e. in a second preliminary initialization step, the teleprocessing device sets and stores in the digital memory an initial impedance-related alert-threshold value;
 f. injecting the set of N AC signals into the data communication network by the AC signal generating device;
 g. measuring the network bus impedance for each of the injected AC signal by the impedance measuring device to thereby create a respective set of N impedance values of N RT-signals each of a different frequency as in the set of N reference AC signals;
 h. statistically comparing each of the measured impedance values of the N RT-signals with the respective impedance values of the reference AC signal in the initial set, to thereby form a set of N comparison-results; and
 i. upon determining that any of the impedance values of the RT-signals is greater than the alert-threshold value, activating an alert.

In some embodiments, where the working bit rate of the data communication network bus is substantially lower than the frequencies of the AC signals and thereby, the AC signals do not interfere with the normal operational activity of the network bus.

In some embodiments, the working bit rate of the data communication network bus is such that the AC signals may interfere with the normal operational activity of the network bus. In such embodiments the steps of determining the alert-threshold value; the injecting of the set of N AC signals into the data communication network; and the measuring of the network bus impedance for each of the injected AC signal, is performed when the data communication network is in Deep Sleep Mode.

According to further teachings of the present invention there is provided an example system for detecting malicious hardware on a data communication network, such as a vehicle data communication network, having a network bus, the system including a teleprocessing device, a low current signal generating device, and a low current measuring device.

The teleprocessing device is configured to activate the low current signal generating device to thereby continuously inject low current signal.

The teleprocessing device is configured to activate the low current measuring device to thereby continuously measure the low current signal, wherein upon determining, by the teleprocessing device, that the low current is lower than a preset current-threshold value, activate an alert.

In some embodiments of this system, the low current signal is less than 100 µA.

In embodiments of this system, the low current signal may be either AC or DC.

In some embodiments of these systems, the digital memory is part of a remote server.

According to further teachings of the present invention there is provided an example process for detecting malicious hardware on a data communication network having a network bus, the process including the steps of:
a. providing a low current signal generating device;
b. providing a low current measuring device;
c. continuously injecting a low current signal into the data communication network by the low current signal generating device;
d. continuously measuring the low current signal by the low current measuring device; and
e. upon determining that the low current is lower than a preset current-threshold value, activate an alert.

This document references terms that are used consistently or interchangeably herein. These terms, including variations thereof, are as follows.

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., smartphone, personal digital assistant (PDA), mobile telephone or cellular telephone).

A server is typically a remote computer or remote computer system including a cloud-based computer/server, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software-based emulation of a computer.

It should be noted that where the present invention is described in terms of the server configured to be a cloud-based server, it is given by way of example only, with no limitation, and any other type of server known in the art may be used.

Unless otherwise defined herein, all technical and/or scientific terms used herein have the same meaning as commonly understood by one of ordinary skilled in the art to which the invention pertains. Although methods and materials similar or equivalent to those described herein may be used in the practice or testing of embodiments of the invention, example methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where reference-like numerals or characters indicate corresponding or similar components. In the drawings.

DETAILED DESCRIPTION OF SOME EMBODIMENTS OF THE INVENTION

Before explaining at least one embodiment of the invention in detail, it is to be understood that the invention is not necessarily limited in its application to the details of construction and the arrangement of the components and/or methods/processes set forth in the following description and/or illustrated in the drawings. The invention is capable of other embodiments or of being practiced or carried out in various ways.

As will be appreciated by one skilled in the art, aspects of the present invention may be embodied as a system, methods/processes or as computer program products. Accordingly, aspects of the present invention may take the form of being an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable (storage) medium(s) having computer readable program code embodied thereon.

An embodiment is an example or implementation of the invention. The various appearances of "one embodiment," "an embodiment" or "some embodiments" do not necessarily all refer to the same embodiment. Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the invention. It is understood that the phraseology and terminology employed herein are not to be construed as limiting and are for descriptive purpose only.

Throughout this document, numerous textual and graphical references are made to trademarks, and domain names. These trademarks and domain names are the property of their respective owners, and are referenced only for explanation purposes herein.

It should be noted that orientation related descriptions such as "bottom", "up", "upper", "down", "lower", "top" and the like, assumes that the associated vehicle is operationally situated.

Reference is made to the drawings. FIG. 4 is a schematic diagram showing an example vehicle-identification system 100 for detecting malicious hardware on a vehicle data communication network using, for example, impedance measurement according to embodiments of the present invention. Vehicle-identification system 100 includes a vehicle 110 having a CAN-bus 120, a teleprocessing device 130, a data base (DB) 170, an AC signal generating device 140, an impedance measuring device 142 and optionally, a vehicle-intrusion server, such as cloud-based server 150. Optionally, AC signal generating device 140 and impedance measuring device 142 are embodied as a single device.

The AC signal generator 140 is configured to generate signals in a preconfigured range of frequencies, wherein a set of such signals is preset, wherein the signals of the preset group of signals have frequency within the preconfigured range of frequencies.

Figure 5:
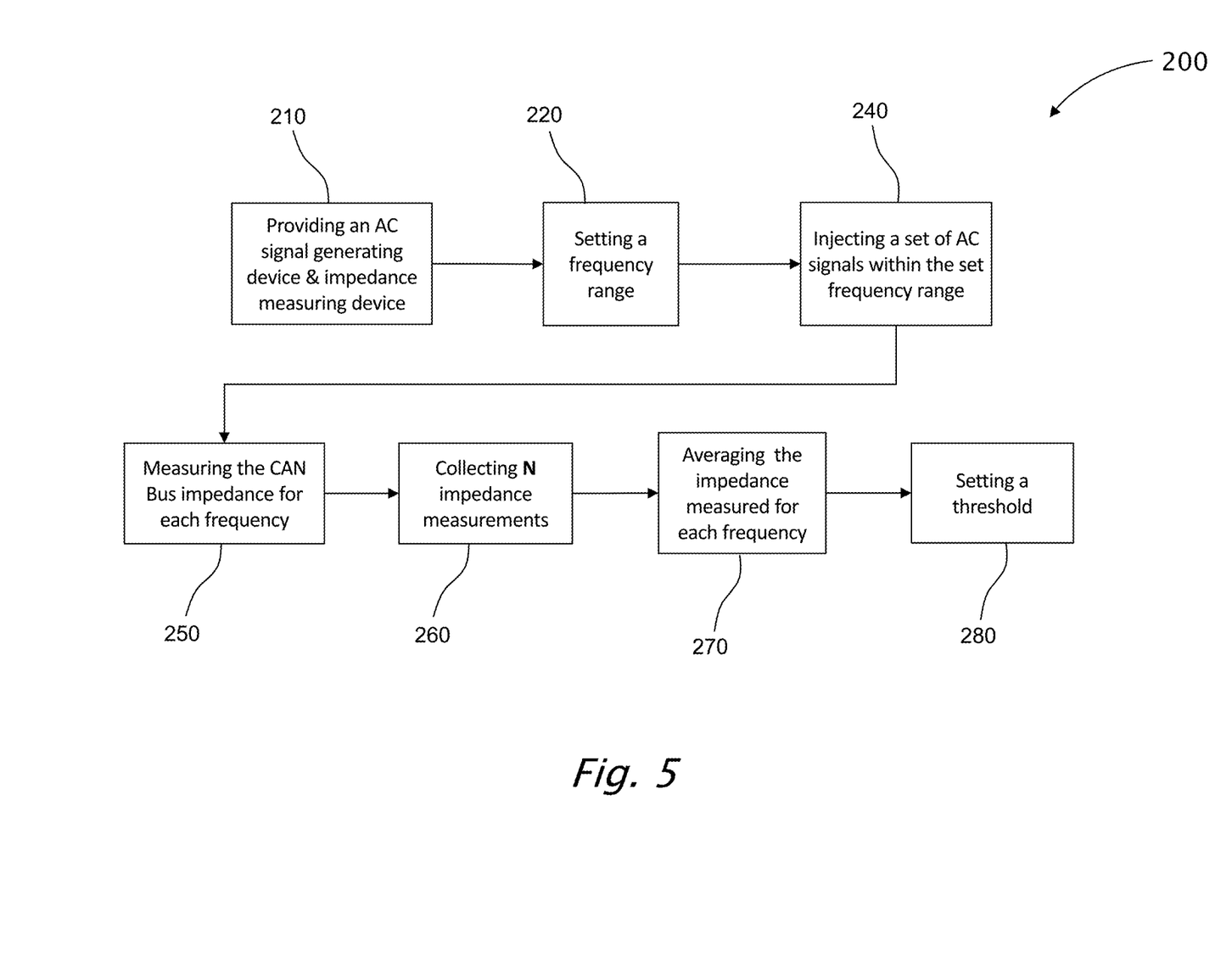
FIG. 5 is a schematic flow chart diagram showing an example preliminary process for determining an initial/updated impedance threshold value for a CAN bus having a known specific configuration, according to embodiments of the present invention.

The schematic flow chart 200 shown in FIG. 5 describes an embodiment process for determining an initial/updated impedance threshold value for CAN bus 120 having a specific, known configuration. Process 200 proceeds as follows:

Step 210: placing an AC signal generating device and impedance measuring device data.

As a preliminary step, an AC signal generating device 140 and an impedance measuring device 142 are placed on CAN bus 120. AC signal generating device 140 and impedance measuring device 142 may be embodied as a single device.

Step 220: setting a frequency range.

The AC signal generator 140 is configured to generate reference signals in a preconfigured range of frequencies, wherein a set of N such reference signals, each having a different frequency, is formed, wherein the frequency of each of the signals is within the preconfigured range of frequencies.

Step 240: injecting the set of AC signals within the set frequency range.

Teleprocessing device 130 injects, one at a time, the signals of the set of signals formed in step 220.

Step 250: measuring the CAN bus impedance for each frequency.

Teleprocessing device 130 measures the CAN bus impedance for each injected signal having its own frequency.

Step 260: collecting N impedance measurements.

Teleprocessing device 130 collects, for each frequency$_j$, the last K impedance measurements, and saves the impedance measurements in DB 170.

Step 270: averaging the measuring impedance for each frequency.

Teleprocessing device 130 averages the measuring impedance for each frequency$_j$.

In a non-limiting example, the last K impedance measurements in each frequency$_j$ are averaged, as follows:

$$\frac{1}{K}\sum_{i=1}^{i=K}(IMP_i) = \text{avg\_imp}_j,$$

where K>0.

The result is a set of N averaged-golden-signals-set.

Teleprocessing device 130 then saves the averaged-golden-signals-set in DB 170.

Step 280: setting a threshold.

It should be noted that the setting of an alert-threshold value may be done empirically, depending on the statistical comparison used, such as mean square error (MSE), being a non-limiting example.

In some embodiments, the statistical comparison uses a machine learning technique of data sets comparison, as an alternative to the mentioned MSE averaging. For example, a prediction algorithm such as logistic regression, random forest or other machine learning algorithms that can be leveraged to improve the system performance results.

Example

A set of impedance average avg_imp$_j$ is created, as in step 270.

Then, teleprocessing device 130 performs a statistical comparison using, as a non-limiting example, mean square error (MSE). For each frequency$_j$, the latest set of the last N impedance measurements is compared to the respective impedance average avg_imp$_j$, as follows:

$\Sigma_{j=1}^{j=N}(\text{Last\_measurement}_j - \text{avg\_imp}_j)^2 = \text{MSE\_comparison\_result}_j$.

The value of the alert-threshold may then be calculated based on the averages of the N MSE_comparison_results and set as follows:

$$X * \frac{1}{J}\sum_{i=1}^{i=J}(\text{MSE\_TH\_result}_j) = \text{alert-threshold},$$

where X is a desired factor.

Teleprocessing device 130 then saves the impedance alert-threshold value in DB 170. Optionally, teleprocessing device 130 may report the alert to a vendor's cloud-based security operation center or to the driver.
[end of process 200]

It should be noted that process 200 may be repeated periodically to update the averaged-golden-signals-set.

Figure 6:
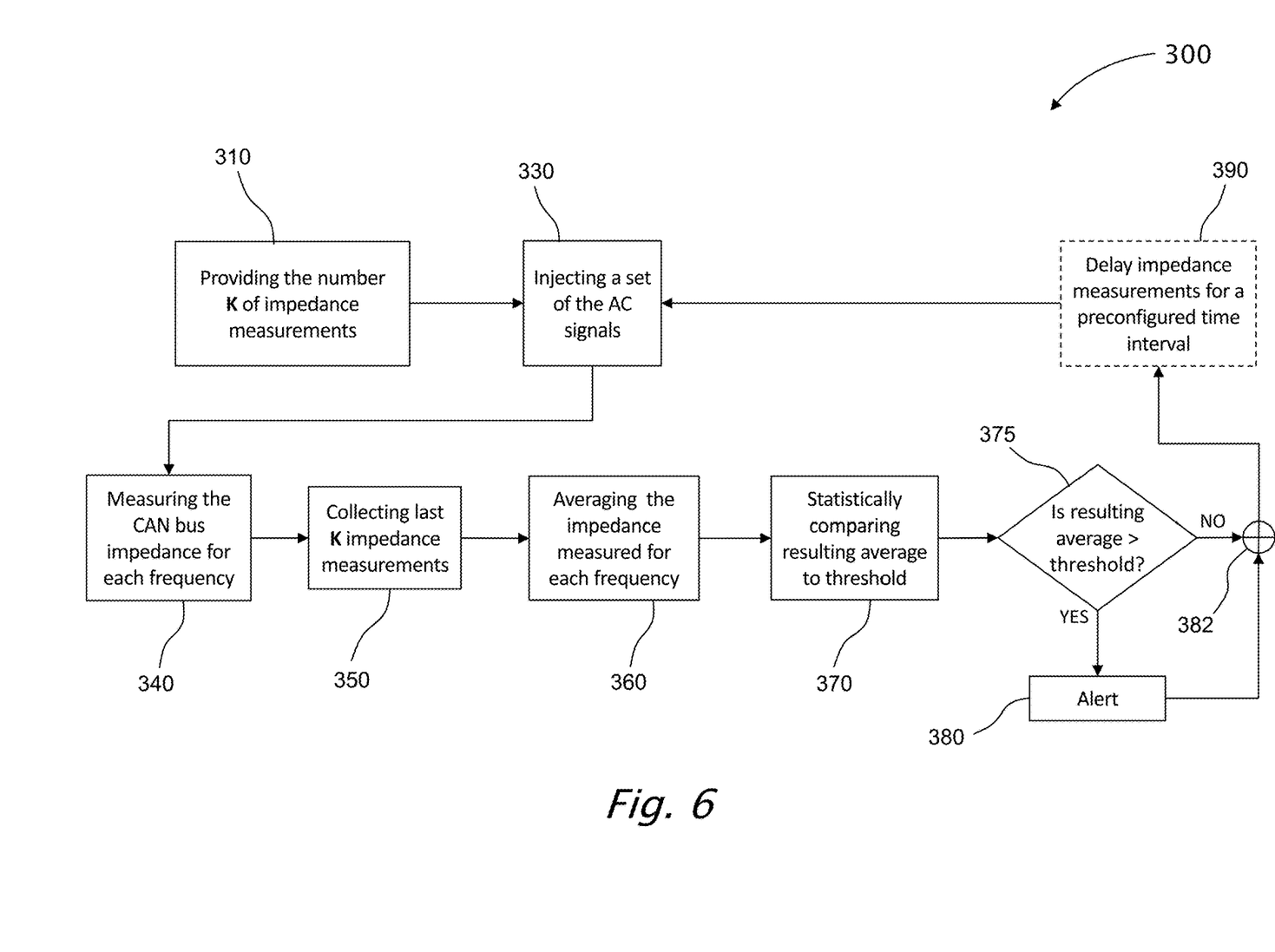
FIG. 6 is a schematic flow chart showing an example process for detecting malicious hardware on a vehicle data communication network, utilizing impedance measurements, according to embodiments of the present invention.

The schematic flow chart 300 shown in FIG. 6 describes an embodiment process for detecting malicious hardware on a vehicle data communication network (120), utilizing impedance measurements. Process 300 proceeds as follows:

Step 310: providing a number K of impedance measurements.

The number K of impedance measurements is set.

Step 330: injecting the set of AC signals within the preconfigured frequency range.

Teleprocessing device 130 injects, one at a time, the signals of the set of the N signals, within the preconfigured frequency range, compatible with the saves averaged-golden-signals-set, formed in step 220.

Step 340: measuring the CAN bus impedance for each frequency.

Teleprocessing device 130 measures the CAN bus impedance for each injected signal having its own frequency.

Step 350: collecting the last K impedance measurements.

Teleprocessing device 130 collects K impedance measurements, saved in DB 170.

Step 360: averaging the measuring impedance for each frequency.

Teleprocessing device 130 averages the measuring impedance for each frequency$_j$.

In a non-limiting example, the K impedance measurements each frequency$_j$ are averaged, as follows:

$$\frac{1}{K}\sum_{i=1}^{i=K}(IMP_i) = \text{avg\_imp}_j,$$

where K>0.

The result is a set of N averaged-RT-signals-set.

Step 370: statistically comparing averaging-RT-result-set to respective averaged-golden-signals-set.

Teleprocessing device 130 performs a statistical comparison using, as a non-limiting example, mean square error (MSE). For each frequency, the averaged-RT-signals-set is compared to the respective impedance in averaged-golden-signals-set for that frequency$_j$, as follows:

$\Sigma_{j=1}^{j=N}(\text{Last\_measurement}_j - \text{avg\_imp}_j)^2 = \text{MSE\_comparison\_result}_j$.

Preferably, teleprocessing device 130 then uses the set of the "last-measurements" to update the set of the "avg_imp" and the impedance alert-threshold. That is, the "avg_imp" may be using the last K impedance measurements, including the "last-measurement". The recalculated "avg_imp" is then saved in DB 170.

Teleprocessing device 130 then saves the impedance alert-threshold value in DB 170.

Step 375: check if comparison-result>a preset alert-threshold.

Teleprocessing device 130 check if at least one comparison-result$_j$>a preset alert-threshold.

Example

The setting of an alert-threshold value may be done empirically, depending on the statistical comparison used, such as mean square error (MSE), being a non-limiting example.

Using MSE in this non-limiting example, leads to an MSE-result that is an average of all squares of the differences between each signal average impedance and the respective signal in the averaged-golden-signals-set.

Disconnecting a device from the CAN bus or adding one to the CAN bus, typically leads to a jump in the average of MSE results of:

1000*(average of all MSE results).

Hence, by setting the alert-threshold to X*(average result of multiple MSE results), where X is set, for example to X=10, we obtain, upon disconnecting a device from the CAN bus or adding one to the CAN bus:

1000*(average of all MSE results)>>alert-threshold.

[end of example]

It has been determined that for all comparison-results$_j$, comparison-result$_j$<alert-threshold, therefore go to step 382.

Step 380: prompt alert.

It has been determined that at least one comparison-result$_j$>alert-threshold. Therefore, an alert is set alerting a possibility of the presence of malicious hardware.

Step 382: comparing averaging-RT-result-set to respective threshold in thresholds-set. there is no presence of malicious hardware.

Step 390: delay impedance measurements for a preconfigured time interval.

Optionally, teleprocessing device 130 delays further impedance measurements for a preconfigured time-interval.

Go to step 330.

[end of process 300]

Figure 7:
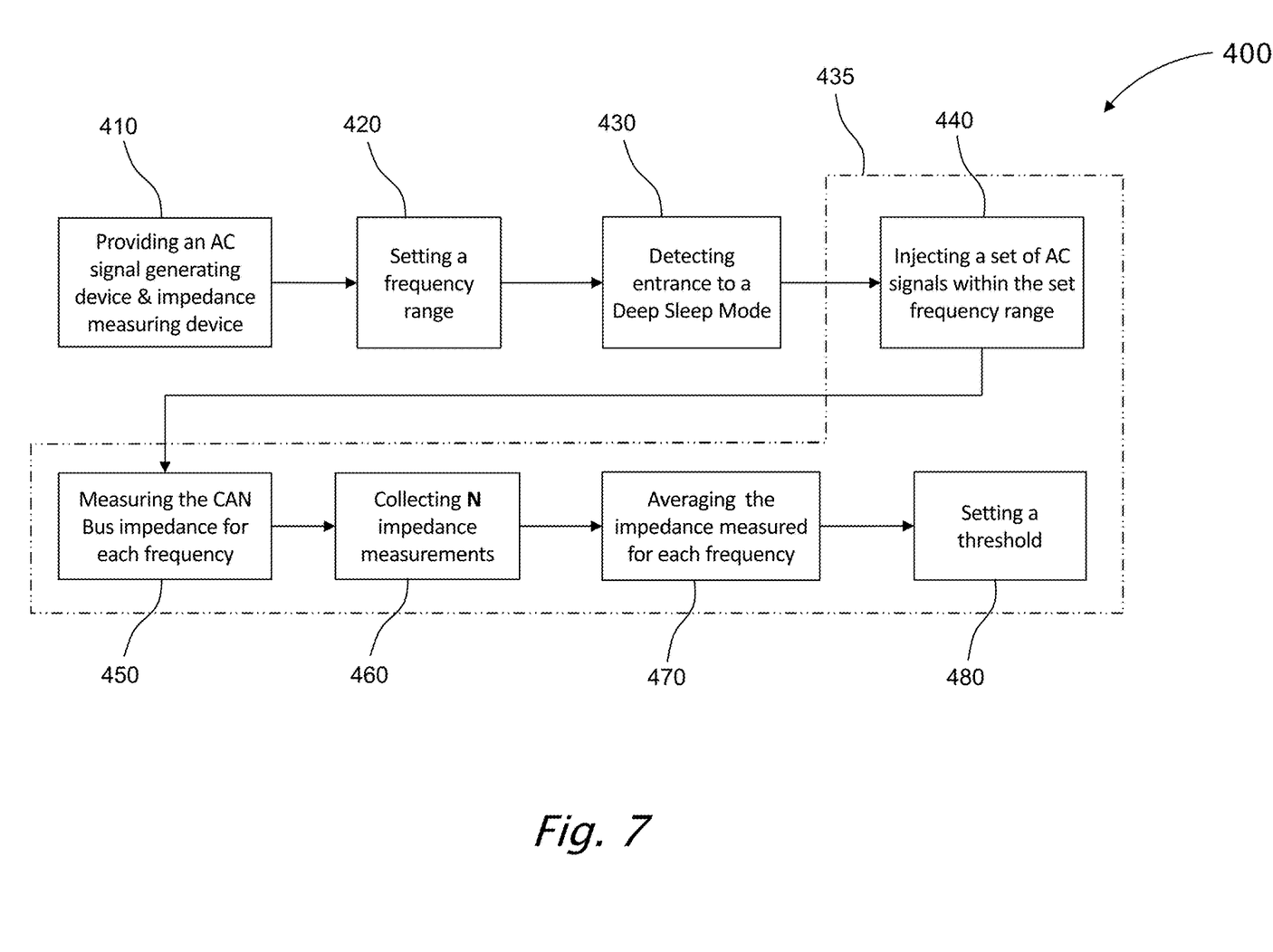
FIG. 7 is a schematic flow chart showing another example preliminary process for determining an initial/updated impedance threshold value for a CAN bus having a known specific configuration, according to embodiments of the present invention.

The schematic flow chart 400 shown in FIG. 7 describes a preferred embodiment process for determining an initial/ updated impedance threshold value for CAN bus 120 have a specific, known configuration. Process 400 proceeds as follows:

Step 410: providing an AC signal generating device and impedance measuring device data.

Teleprocessing device 130 begins by placing AC signal generating device 140 and impedance measuring device 142 on CAN bus 120. AC signal generating device 140 and impedance measuring device 142 may be embodied as a single device.

Step 420: setting a frequency range.

The AC signal generator 140 is configured to generate signals in a preconfigured range of frequencies, wherein a set of such signals, each of a different frequency, is preset, wherein the signals of the formed preset group have a frequency within the preconfigured range of frequencies.

Step 430: detecting entrance to a Deep Sleep Mode.

Teleprocessing device 130 monitors activity of the CAN bus, to determine entrance to a Deep Sleep Mode. For example, with no limitation—there is no CAN communication for at least 20 seconds.

Upon detecting entrance to a Deep Sleep Mode, impedance measuring steps 435 takes place, as follows:

Step 440: injecting the set of AC signals within the set frequency range.

Teleprocessing device 130 injects, one at a time, the signals of the set of signals formed in step 420.

Step 450: measuring the CAN bus impedance for each frequency.

Teleprocessing device 130 measures the CAN bus impedance for each injected signal having its own frequency.

Step 460: collecting N impedance measurements.

Teleprocessing device 130 collects N impedance measurements, saved in DB 170.

Step 470: averaging the measuring impedance for each frequency.

Teleprocessing device 130 averages the measuring impedance for each frequency$_j$.

In a non-limiting example, the statistical averaging is performed as follows, using mean square error (MSE):

In a non-limiting example, firstly, the last K impedance measurements each frequency$_j$ are averaged, as follows:

$$\frac{1}{K}\sum_{i=1}^{i=K}(IMP_i) = \text{avg\_imp}_j,$$

where K>0.

The result is a set of N averaged-golden-signals-set.

Teleprocessing device 130 then saves the averaged-golden-signals-set in DB 170.

Step 480: setting a threshold.

Teleprocessing device 130 sets an impedance alert-threshold value similarly to the threshold setting in step 280.

Teleprocessing device 130 then saves the impedance alert-threshold value in DB 170. Optionally, teleprocessing device 130 may report the alert to a vendor's cloud-based security operation center or to the driver.

[end of process 400]

It should be noted that process 400 may be repeated periodically to update the averaged-golden-signals-set.

Figure 8:
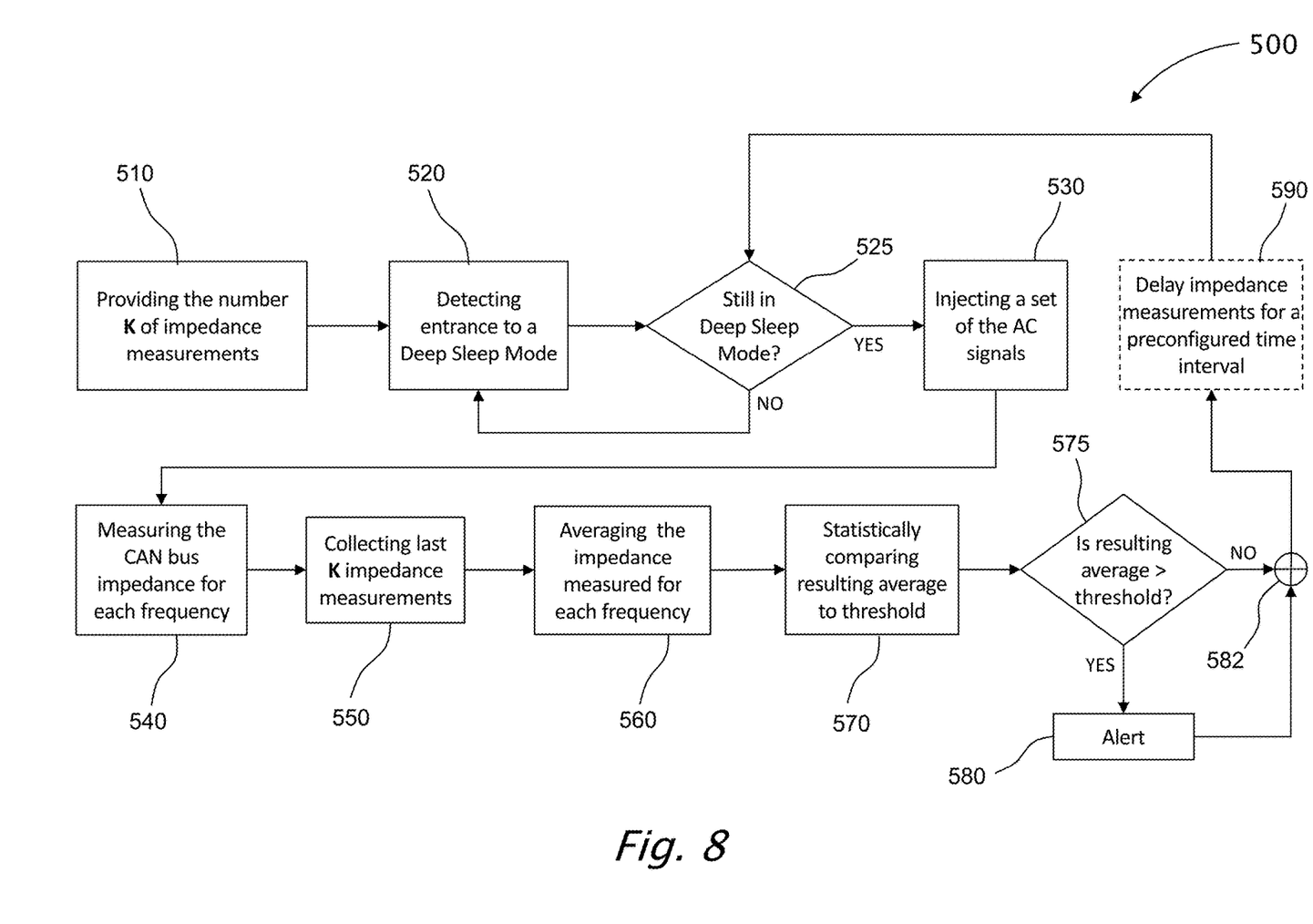
FIG. 8 is a schematic flow chart showing another example process for detecting malicious hardware on a vehicle data communication network, utilizing impedance measurements, according to embodiments of the present invention.

The schematic flow chart 500 shown in FIG. 8 describes an embodiment process for detecting malicious hardware on a vehicle data communication network (120), utilizing impedance measurement. Process 500 proceeds as follows:

Step 510: providing a number K of impedance measurements.

The number K of impedance measurements is set.

Step 520: detecting entrance to a Deep Sleep Mode.

Teleprocessing device 130 monitors activity of the CAN bus, to determine entrance to a Deep Sleep Mode. For example, with no limitation—there is no CAN communication for at least 20 seconds.

Step 525: checking if entered Deep Sleep Mode.

Teleprocessing device 130 checks if conditions for entering Deep Sleep Mode exist. If not, go back to step 520.

Step 530: injecting the set of AC signals within the set frequency range.

It has been determined that the CAN bus entered Deep Sleep Mode.

Teleprocessing device 130 injects, one at a time, the signals of the set of signals formed in step 420.

Step 540: measuring the CAN bus impedance for each frequency.

Teleprocessing device 130 measures the CAN bus impedance for each injected signal having its own frequency.

Step 550: collecting the last K impedance measurements.

Teleprocessing device 130 collects K impedance measurements, saved in DB 170.

Step 560: averaging the measuring impedance for each frequency.

Teleprocessing device 130 averages the measuring impedance for each frequency$_j$.

In a non-limiting example, the K impedance measurements each frequency$_j$ are averaged, as follows:

$$\frac{1}{K}\sum_{i=1}^{i=K}(IMP_i) = \text{avg\_imp}_j,$$

where K>0.

The result is a set of N averaged-RT-signals-set.

Step 570: statistically comparing averaging-RT-result-set to respective averaged-golden-signals-set.

Teleprocessing device 130 performs a statistical comparison using, as non-limiting example, mean square error (MSE). For each frequency$_j$ the averaged-RT-signals-set is compared to the respective impedance in averaged-golden-signals-set for that frequency$_j$, as follows:

$$\Sigma_{j=1}^{j=N}(\text{Last\_measurement}_j - \text{avg\_imp}_j)^2 = \text{MSE\_comparison\_result}_j.$$

Preferably, teleprocessing processing device 130 then uses the set of the "last-measurements" to update the set of the "avg\_imp" and the impedance alert-threshold. That is, the "avg\_imp" may be using the last K impedance measurements, including the "last-measurement". The recalculated "avg\_imp" is then saved in DB 170.

Teleprocessing device 130 then saves the impedance alert-threshold value in DB 170.

Step 575: check if comparison-result>a preset alert-threshold.

Teleprocessing device 130 check if at least one comparison-result$_j$>a preset alert-threshold. If not, go to step 582.

Step 580: prompt alert.

It has been determined that at least one comparison-result$_j$>alert-threshold. Therefore, an alert is activated, alerting a possibility of the presence of malicious hardware. Optionally, teleprocessing device 130 may report the alert to a vendor's cloud-based security operation center or to the driver.

Step 582: proceed.

Process 500 proceed, weather the presence of a malicious hardware has been detected or not.

Step 590: delay impedance measurements for a preconfigured time interval.

Optionally, teleprocessing device 130 delays further impedance measurements for a preconfigured time interval.

Go to step 525.

[end of process 500]

Figure 9:
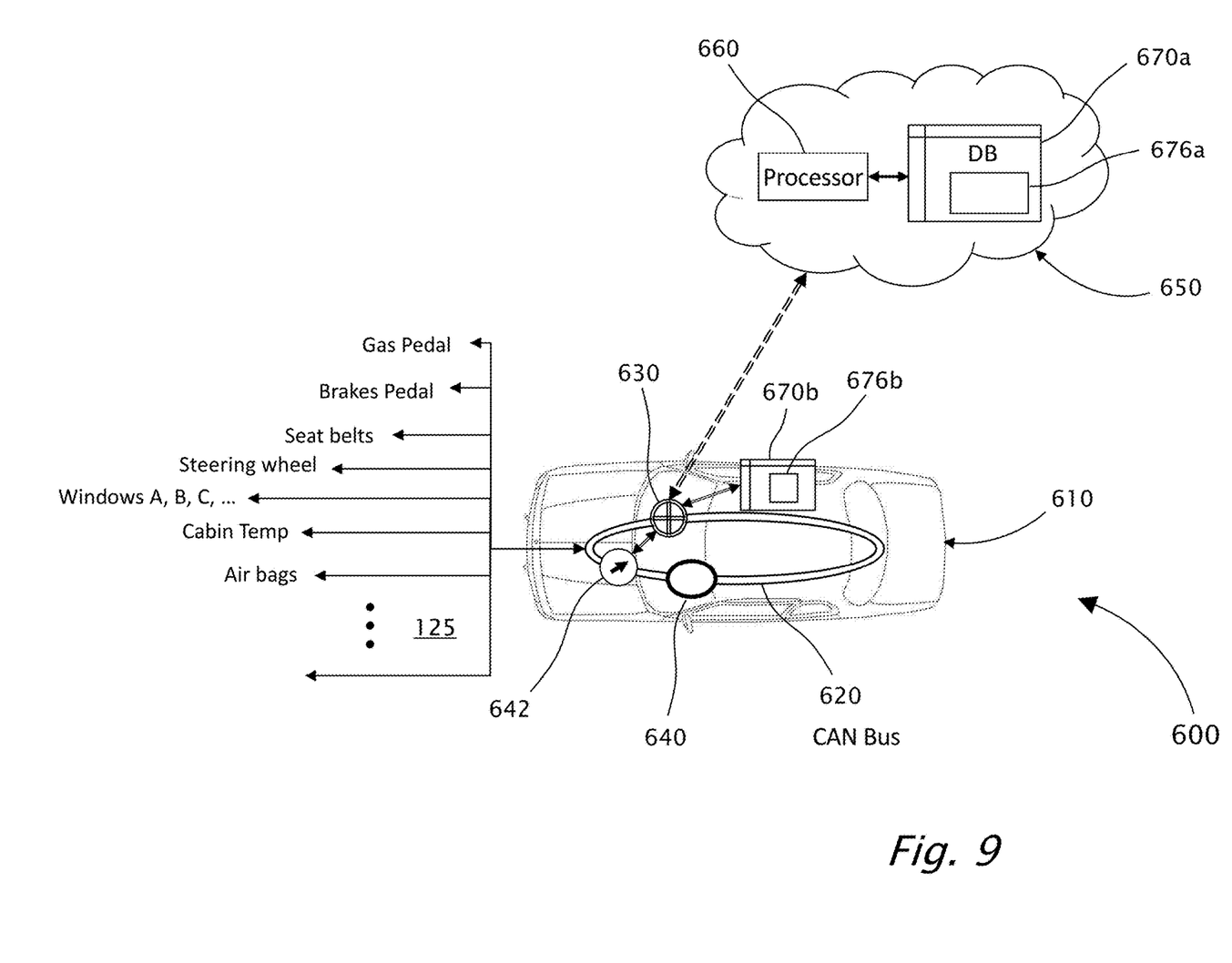
FIG. 9 is a schematic diagram showing an example vehicle-identification system for detecting malicious hardware on a vehicle data communication network utilizing low current measurements, according to embodiments of the present invention.
Figure 10:
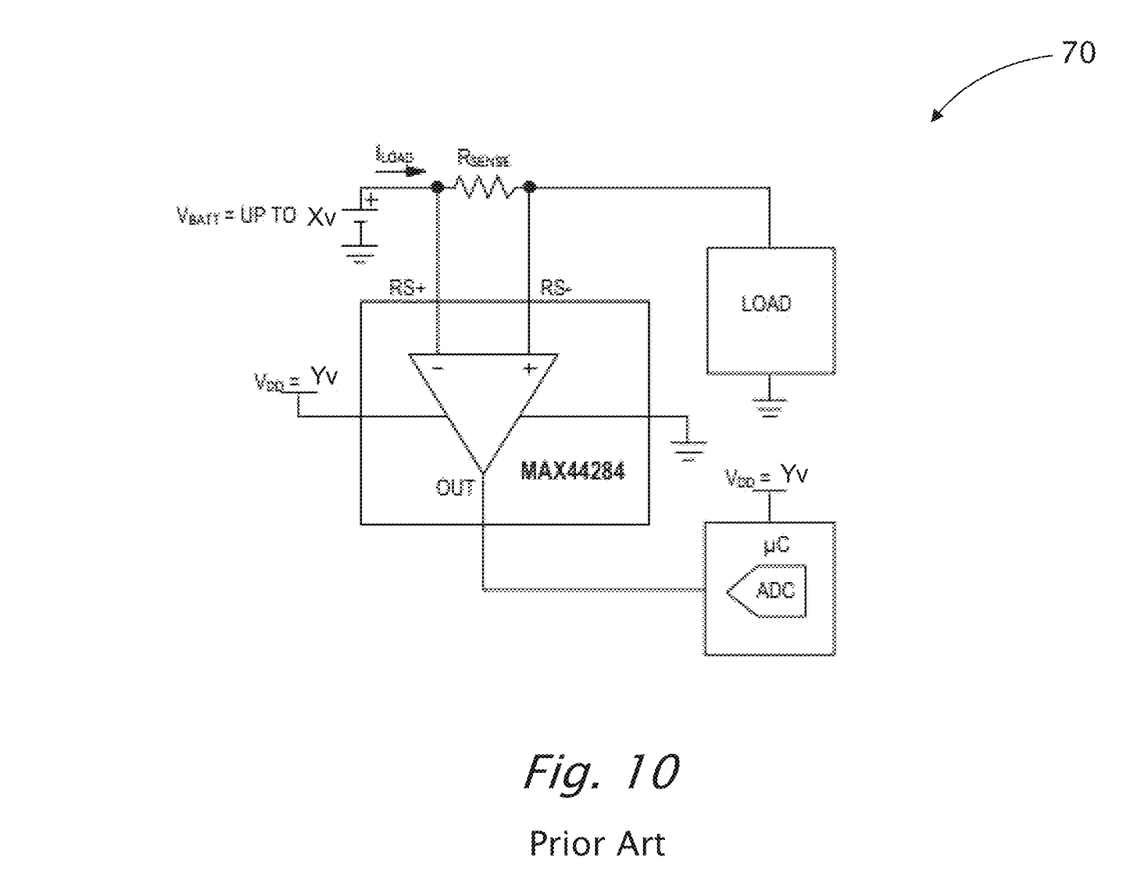
FIG. 10 (prior art) is a schematic diagram showing an example of a current-sense amplifier.

Reference is made to the drawings. FIG. 9 is a schematic diagram showing an example of vehicle-identification system 600 for detecting malicious hardware on a vehicle data communication network utilizing, for example, low current measurements, according to embodiments of the present invention. Vehicle-identification system 600 includes a vehicle 610 having a CAN-bus 620, a teleprocessing device 630, a data base (DB) 670, a low current signal generating device 640, a low current measuring device 642 and optionally, a vehicle-intrusion server, such as cloud-based server 650. Optionally, low current signal generating device 640 and low current measuring device 642 are embodied as a single device. Current source such as XTR111 of TI, may be used for low current signal generating device 640. FIG. 10 schematically shows a non-limiting example of a current-sense amplifier 60 Max44284 component of Maxim, that can be for low current measuring device 642.

Typically, the low current signal generator 640 is configured to generate low current signals, for example, with no limitations, I<100 µA into tested lines, such as with no limitations, a CAN-bus 620.

Figure 11:
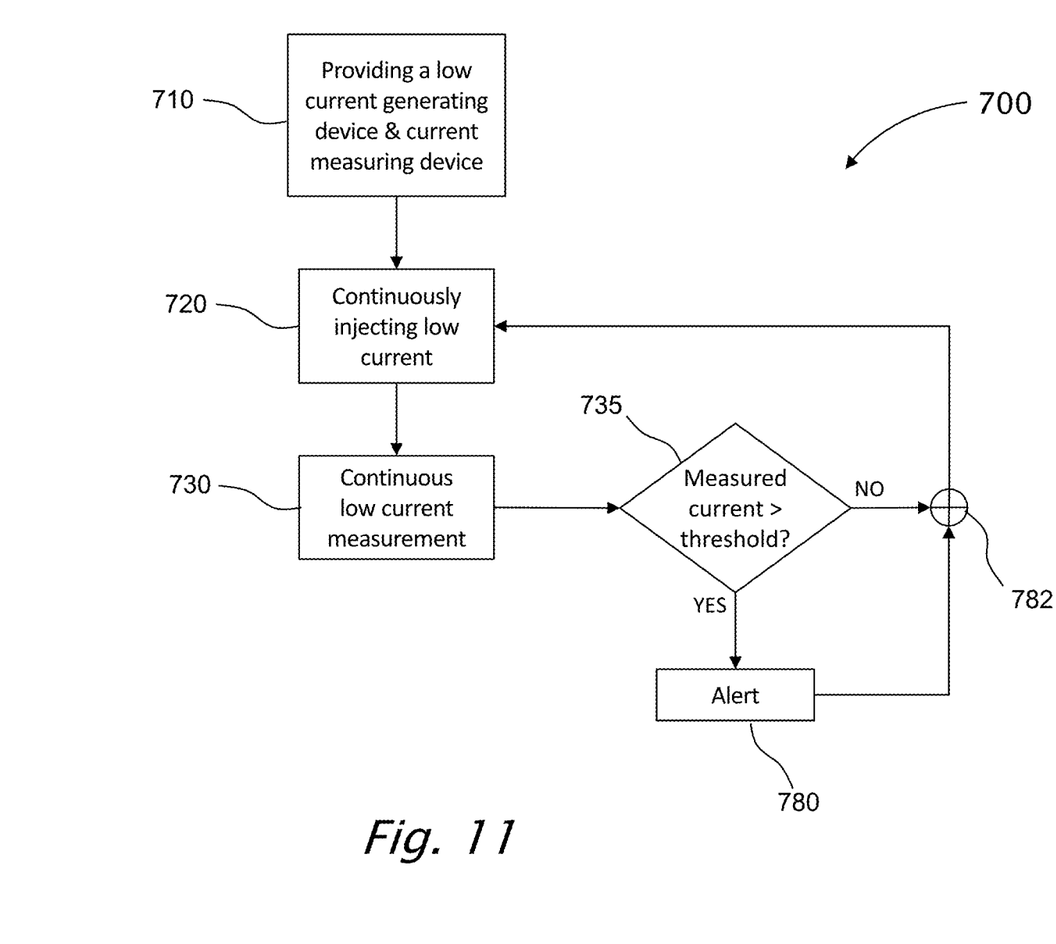
FIG. 11 is a schematic flow chart showing another example process for detecting malicious hardware on a vehicle data communication network, utilizing continuous low current injection and measurement, according to embodiments of the present invention.

The schematic flow chart 700 shown in FIG. 11 describes another embodiment process for detecting malicious hardware on a vehicle data communication network (620), utilizing continuous low current injection and measurement. Process 700 proceeds as follows:

Step 710: providing a low current signal generating device and low current measuring device data.

Teleprocessing device 630 begins by placing low current signal generating device 640 and low current measuring device 642 on CAN bus 620. Low current signal generating device 640 and low current measuring device 642 may be embodied as a single device.

Step 720: continuously injecting a low current signal into the CAN bus.

Teleprocessing device 630 activates low current signal generating device 640 to continuously inject low current signal into the CAN bus 620. The current signal itself may be a continuous signal or a pulse signal.

It should be noted that low current signal generating device 640 is configured to inject the low current signal onto CAN bus 620, wherein the low current signal "rides" on top of the other signals in CAN bus 620 without interfering. This then allows to monitor voltage changes evolving in the system using current-sense amplifier 60, such as Max44284, having a precise resistor and a special amplifier.

It should be noted that the injected current can be continuous, or we can decide to send short pulses which are fast enough (for example every 100 ms) to catch any change on the bus in real time. A change can be a replacement of an ECU on the bus or a disconnection or adding a device.

Step 730: continuously measuring the low current signal on the CAN bus.

Teleprocessing device 630 activates low current measuring device 642 to continuously sense the flow of the low current signal in the CAN bus 620.

Step 735: check if the detected low current is greater than a preset threshold.

Teleprocessing device 630 checks if the detected low current is lower than a preset alert-threshold. If not, go to step 782.

Step 780: prompt alert.

It has been determined that at the detected low current is lower than a preset alert-threshold. Therefore, an alert is activated, alerting a possibility of the presence of malicious hardware. Optionally, teleprocessing device 130 may report the alert to a vendor's cloud-based security operation center or to the driver.

Step 782: proceed.

Process 700 proceed, weather the presence of a malicious hardware has been detected or not.

[end of process 700]

The invention being thus described in terms of several embodiments and examples, it will be obvious that the same may be varied in many ways. Such variations are not to be regarded as a departure from the spirit and scope of the invention, and all such modifications as would be obvious to one skilled in the art.

What is claimed is:

1. A non-interfering system for detecting a malicious modification of hardware on an in-vehicle communication bus, the system comprising:

a. a teleprocessing device coupled with digital memory;
   b. an AC signal generating device; and
   c. an impedance measuring device, wherein, in a preliminary initialization step, said teleprocessing device forms and stores in said digital memory a set of N reference AC signals injected by said AC signal generating device into the in-vehicle communication bus, wherein each AC signal in said set of N reference AC signals has a different frequency, and wherein each AC signal in said set of N reference AC signals is the average of $k_1$ impedance measurements of multiple AC signals of the same frequency, wherein $k_1>0$;

wherein in a second preliminary initialization step, an initial impedance-related alert-threshold value is set and stored in said digital memory;

wherein in a real-time operation said teleprocessing device is configured to activate said AC signal generating device to thereby inject said set of N AC signals into the in-vehicle communication bus in such a low current level which is not interfering with either an active operation or with a deep sleep mode of the in-vehicle communication bus;

wherein in the real-time operation said teleprocessing device is configured to activate said impedance measuring device to thereby measure the network bus impedance for each of said N frequencies, forming a set of impedance values of N RT-signals each of a different frequency as in said set of N reference AC signals;

wherein said teleprocessing device is configured to statistically compare each of said impedance values of said N RT-signals with the respective impedance values of said reference AC signal in the initial set, to thereby form a set of N comparison-results;

wherein upon determining, by said teleprocessing device, that any of said impedance values of said RT-signals is greater than said alert-threshold value, said teleprocessing device activates an alert;

wherein said real-time operation of the system is performed either during an active operation of the in-vehicle communication bus, or during a deep sleep mode of the in-vehicle communication bus;

wherein the in-vehicle communication bus has at least three electronic control units (ECUs); and wherein the malicious modification of hardware is a replacement of an ECU on the in-vehicle communication bus or a disconnection or addition of a device.

2. The system as in claim 1, wherein said statistically averaging is a Mean Square Error (MSE) averaging.

3. The system as in claim 1, wherein said statistically averaging uses a machine learning technique of data sets comparison, said machine learning technique is a prediction algorithm selected from the group including a logistic regression and random forest.

4. The system as in claim 1, wherein each of said impedance value of said N RT-signals is an average of $k_2$ impedance measurements for each frequency, wherein $k_2 > 1$.

5. The system as in claim 1, wherein said digital memory is part of a remote server.

6. The system as in claim 1, wherein said digital memory is part of a remote server.

7. The non-interfering system as in claim 1, wherein:
  a. when the real-time operation is performed simultaneously with the active operation of the in-vehicle communication bus, the impedance measurement is further performed in a non-interfering frequency range different from the frequency of signals normally existing on the in-vehicle communication bus; and
  b. when the real-time operation is performed simultaneously with the deep sleep mode of the bus, the system first determines a period of no transmission on the in-vehicle communication bus longer that a predefined period.

8. A non-interfering process for detecting a malicious modification of hardware on an in-vehicle communication bus having at least three Electronic Control Units (ECUs) ECUs, the process comprising the steps of:
  a. providing an AC signal generating device;
  b. providing an impedance measuring device;
  c. providing digital memory for storing digital data;
  d. in a first preliminary initialization step, forming and storing in said digital memory a set of N reference AC signals injected by said AC signal generating device into the in-vehicle communication bus, wherein each AC signal in said set of N reference AC signals has a different frequency, and wherein each AC signal in said set of N reference AC signals is the average of $k_1$ impedance measurements of multiple AC signals of the same frequency, wherein $k_1 > 0$;
  e. in a second preliminary initialization step said teleprocessing device sets and stores in said digital memory an initial impedance-related alert-threshold value;
  f. in a first real-time operation step, injecting said set of N AC signals into the in-vehicle communication bus by said AC signal generating device in such a low current level which is not interfering with either an active operation or with a deep sleep mode of the in-vehicle communication bus;
  g. in a second real-time operation step, measuring the network bus impedance for each said injected AC signal by said impedance measuring device to thereby create a respective set of N impedance values of N RT-signals each of a different frequency as in said set of N reference AC signals;
  h. statistically comparing each said measured impedance value of said N RT-signals with the respective impedance value of said reference AC signal in the initial set, to thereby form a set of N comparison-results; and
  i. upon determining that any of said impedance values of said RT-signals is greater than said alert-threshold value, activating an alert;

wherein said real-time steps are performed either during an active operation of the in-vehicle communication bus, or during a deep sleep mode of the in-vehicle communication bus;

wherein the in-vehicle communication bus has at least three electronic control units (ECUs); and wherein the malicious modification is a replacement of an ECU on the in-vehicle communication bus or a discussion or addition of a device.

9. The process as in claim 8, wherein said statistically averaging is a Mean Square Error (MSE) averaging.

10. The process as in claim 8, wherein said statistically averaging uses a machine learning technique of data sets comparison, said machine learning technique is a prediction algorithm selected from the group including a logistic regression and random forest.

11. The process as in claim 8, wherein said digital memory is part of a remote server.

12. The process as in claim 8, wherein the working bit rate of the in-vehicle communication bus is substantially lower than the frequencies of the AC signals and thereby, the AC signals do not interfere with the normal operational activity of the network bus.

13. The process as in claim 8, wherein the working bit rate of the in-vehicle communication bus is such that the AC signals may interfere with the normal operational activity of the network bus, and wherein:
  a. said determining said initial set of impedance threshold values for a respective preset set of N AC signals;
  b. said injecting of said set of N AC signals into the data communication network; and
  c. said measuring of the network bus impedance for each of said injected AC signal, is performed when the data communication network is in Deep Sleep Mode.

14. The non-interfering process as in claim 8, wherein:
  a. when the first and second real time steps are performed simultaneously with the active operation of the in-vehicle communication bus, the impedance measurement is further performed in a non-interfering frequency range different from the frequency of signals normally existing on the in-vehicle communication bus; and
  b. when the first and second real time steps are performed simultaneously with the deep sleep mode of the in-vehicle communication bus, the system first determines a period of no transmission on the in-vehicle communication bus longer than a predefined threshold period.

15. A non-interfering system for detecting a malicious modification of hardware on an in-vehicle communication bus, the system comprising:
  a. a teleprocessing device;
  b. a low current signal generating device; and
  c. a low current measuring device, wherein the low current of the low current signal generating device and the low current of the low current measuring device are either AC or DC configured to such a level which is not interfering with either an active operation or with a deep sleep mode of the in-vehicle communication bus;

wherein said teleprocessing device is configured to activate said low current signal generating device during an active operation of the in-vehicle communication bus, or during a deep sleep mode of the in-vehicle communication bus to thereby continuously inject the low current signal;
wherein said teleprocessing device is configured to activate said low current measuring device during an active operation of the in-vehicle communication bus, or during a deep sleep mode of the in-vehicle communication bus to thereby continuously measure said low current signal;
wherein the in-vehicle communication bus has at least three electronic control units (ECUs);
wherein the malicious modification is a replacement of an ECU on the in-vehicle communication bus or a disconnection or addition of a device; and
wherein upon determining, by said teleprocessing device, that the low current is lower than a preset current-threshold value, activate an alert.

16. The system as in claim 15, wherein said low current signal is less than 100 μA.

17. The non-interfering system as in claim 15, wherein:
   a. when the real-time operation is performed simultaneously with the active operation of the in-vehicle communication bus, the impedance measurement is further performed in a non-interfering frequency range different from the frequency of signals normally existing on the in-vehicle communication bus; and
   b. when the real-time operation is performed simultaneously with the deep sleep mode of the in-vehicle communication bus, the system first determines a period of no transmission on the in-vehicle communication bus longer that a predefined period.

18. A non-interfering process for detecting a malicious modification of hardware on an in-vehicle communication bus comprising the steps of:
   a. providing a low current signal generating device;
   b. providing a low current measuring device;
   c. continuously injecting during an active operation of the in-vehicle communication bus, or during a deep sleep mode of the in-vehicle communication bus a low current signal into the in-vehicle communication bus by said low current signal generating device;
   d. continuously measuring during the active operation of the in-vehicle communication bus, or during the deep sleep mode of the in-vehicle communication bus the low current signal by said low current measuring device; and
   e. upon determining that the measured low current is lower than a preset current-threshold value, activate an alert;
wherein the injected low current of the signal generating device and the low current of the current measuring device are AC or DC configured to a level which is not interfering with either an active operation or with a deep sleep mode of the in-vehicle communication bus;
wherein the in-vehicle communication bus has at least three electronic control units (ECUs); and
wherein the malicious modification is a replacement of an ECU on the in-vehicle communication bus or a disconnection or addition of a device.

19. The process as in claim 18, wherein said low current signal is less than 100 μA.

20. The system as in claim 18, wherein said digital memory is part of a remote server.

21. The non-interfering process as in claim 18, wherein:
   a. when the first and second real time steps are performed simultaneously with the active operation of the in-vehicle communication bus, the impedance measurement is further performed in a non-interfering frequency range different from the frequency of signals normally existing on the in-vehicle communication bus; and
   b. when the first and second real time steps are performed simultaneously with the deep sleep mode of the in-vehicle communication bus, the system first determines a period of no transmission on the in-vehicle communication bus longer than a predefined threshold period.

* * * * *